United States Patent [19]
Yamada et al.

[11] Patent Number: 6,147,778
[45] Date of Patent: Nov. 14, 2000

[54] IMAGE READING APPARATUS

[75] Inventors: Masakatsu Yamada, Kawasaki; Kazuhiko Hasegawa, Abiko; Yasuhiro Matsumoto, Yokohama, all of Japan

[73] Assignee: Canon Kabushiki Kaisha, Tokyo, Japan

[21] Appl. No.: 08/995,879

[22] Filed: Dec. 22, 1997

[30] Foreign Application Priority Data

Dec. 26, 1996 [JP] Japan .................................. 8-356960

[51] Int. Cl.⁷ .............................. H04N 1/04; H04N 1/46
[52] U.S. Cl. ............................................. 358/474; 358/505
[58] Field of Search ................................... 358/474, 496, 358/498, 505, 408

[56] References Cited

U.S. PATENT DOCUMENTS

| | | | |
|---|---|---|---|
| 4,802,229 | 1/1989 | Yamada | 382/1 |
| 4,899,227 | 2/1990 | Yamada | 358/452 |
| 4,959,536 | 9/1990 | Ijuin et al. | 250/216 |
| 4,975,787 | 12/1990 | Ijuin et al. | 358/461 |
| 5,282,064 | 1/1994 | Yamada | 358/487 |
| 5,457,547 | 10/1995 | Yamada | 358/487 |
| 5,489,995 | 2/1996 | Iso et al. | 358/483 |
| 5,764,382 | 6/1998 | Shriaishi | 358/496 |

*Primary Examiner*—Kimberly A. Williams
*Attorney, Agent, or Firm*—Fitzpatrick, Cella, Harper & Scinto

[57] ABSTRACT

An image reading apparatus has a photoelectric converting element for receiving light obtained from an original illuminated by a light source, a lens for imaging the light obtained from the original on the photoelectric converting element, and a guide member for guiding the original to an original reading position, the guide member having a hollow portion for containing the photoelectric converting element and the lens therein.

6 Claims, 3 Drawing Sheets

IMAGE READING APPARATUS

BACKGROUND OF THE INVENTION

1. Field of the Invention

This invention relates to an image reading apparatus for use in a facsimile apparatus, a copying apparatus or the like.

2. Related Background Art

The construction of an image reading apparatus according to the prior art is schematically shown in FIG. 3 of the accompanying drawings. This image reading apparatus 100 is utilized to read the image information of an original in an apparatus such as a copying apparatus or a facsimile apparatus.

In FIG. 3, the reference numeral 101 designates a paper feeding roller for feeding an original, not shown, to a reading position P1, the reference numeral 102 denotes a paper feeding pinch roller, the reference numeral 103 designates a paper discharging roller for carrying out the read original, and the reference numeral 104 denotes a paper discharging pinch roller. The reference numeral 105 designates an upper original guide forming the upper portion of an original conveying route, the reference numeral 106 denotes a lower original guide forming the lower portion of the original conveying route, the reference numeral 107 designates a body frame, the reference numeral 108 denotes an original keeping plate for preventing the floating of the original at the reading position P1, the reference numeral 109 designates a mounting metal fitting for fixing an intimate contact type image sensor unit 110 which will be described later to the body frame 107, and the reference numeral 110 denotes an intimate contact type image sensor unit for reading the information of the original.

The intimate contact type image sensor unit 110 is comprised of a light source 110a for illuminating the read surface of the original, an optical sensor 110b for converting the image information of the original into an electrical signal, a SELFOC lens (trade mark: Nippon Plate Glass Co., Ltd.) 110c for imaging the image information of the original illuminated by the light source 110a on the optical sensor 110b, cover glass 110d for guiding the original near the reading position P1, a sensor chassis 110e for positioning and fixing the light source 110a, the optical sensor 110b and the SELFOC lens 110c, a guide Mylar 110f for eliminating the gap between the lower original guide 106 and the intimate contact type image sensor unit 110 and smoothly guiding the original from the lower original guide 106 to the reading position P1, and a sensor frame 110g for containing the cover glass 110d and the sensor chassis 110e therein.

However, in the above-described example of the prior art, the intimate contact type image sensor unit 110 is designed to be mounted on the body frame 107 by the mounting metal fitting 109, and this has led to the following problems.

The intimate contact type image sensor unit 110 is independent of the lower original guide 106 and therefore, when the mounting metal fitting is deformed with the lapse of time or the relative position of the lower original guide 106 and the body frame 107 is changed, the mounting position accuracy of the intimate contact type image sensor unit 110 goes wrong and it becomes impossible to effect good image reading.

Also, when the intimate contact type image sensor unit 110 is to be mounted on the body frame 107, the adjustment for putting out the reading position is necessary and the assembling property is low.

Further, the mounting metal fitting 109 itself for mounting the intimate contact type image sensor unit 110 on the body frame 107 and the guide Mylar 110f for preventing the original from colliding with the gap between the lower original guide 106 and the intimate contact type image sensor unit 110 are necessary, and necessarily the number of parts and the number of assembling steps become many and this causes an increase in cost.

SUMMARY OF THE INVENTION

The present invention has been made in view of the above-noted problems and an object thereof is to provide an image reading apparatus of high image reading accuracy.

Another object of the present invention is to provide an image reading apparatus which is easy to assemble.

Still another object of the present invention is to provide an image reading apparatus which is reduced in the number of parts.

Yet still another object of the present invention is to provide an image reading apparatus having a photoelectric converting element for receiving light obtained from an original illuminated by a light source, a lens for imaging the light obtained from the original on the photoelectric converting element, and a guide member for guiding the original to an original reading position, the guide member having a hollow portion for containing the photoelectric converting element and the lens therein.

Further objects of the present invention will become apparent from the following detailed description taken in conjunction with the accompanying drawings.

DESCRIPTION OF THE PREFERRED EMBODIMENTS

An image reading apparatus to which the present invention is applied will hereinafter be described with respect to some embodiments thereof.

(Embodiment 1)

Figure 1:
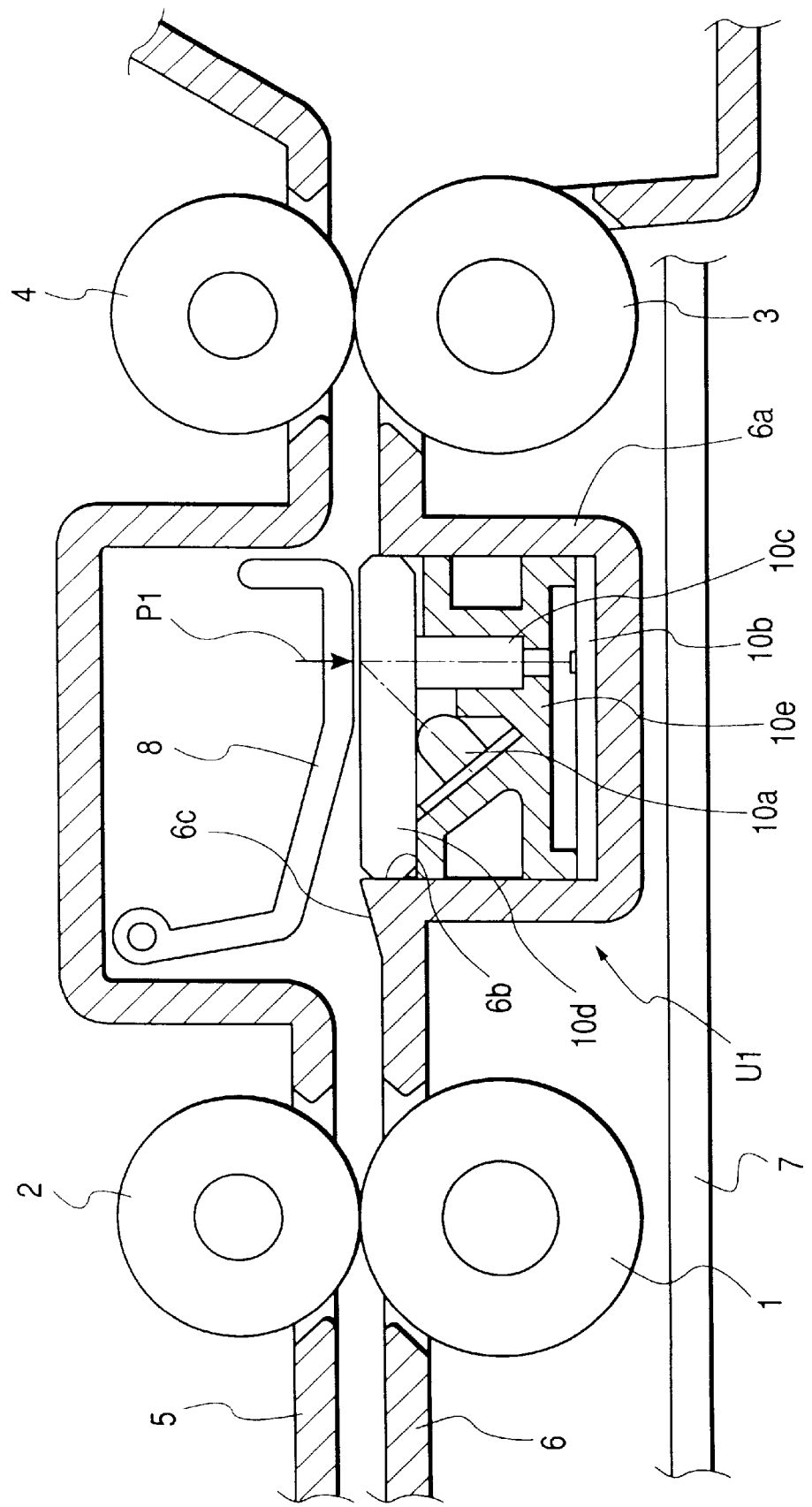
FIG. 1 is a cross-sectional view of the essential portions of an image reading apparatus according to a first embodiment of the present invention.

FIG. 1 is a cross-sectional view for illustrating the essential constituent portions of an image reading apparatus according to a first embodiment of the present invention.

In FIG. 1, the reference numeral 1 designates a paper feeding roller for feeding an original to a reading position P1, the reference numeral 2 denotes a paper feeding pinch roller, the reference numeral 3 designates a paper discharging roller for discharging the read original, the reference numeral 4 denotes a paper discharging pinch roller, the reference numeral 5 designates an upper original guide forming the upper portion of an original conveying route, the reference numeral 6 denotes a lower original guide as a guide member forming the lower portion of the original conveying route, the reference numeral 7 designates the body frame of the image reading apparatus, and the reference numeral 8 denotes an original keeping plate for preventing the floating of the original at the reading position P1.

The reference character 10a designates a light source for illuminating the read surface of the original, the reference character 10b denotes an optical sensor as photoelectric converting means for converting the image information of the original into an electrical signal, and the reference numeral 10c designates a SELFOC lens (registered trademark: Nippon Plate Glass Co., Ltd.) as imaging means for imaging the image information of the original illuminated by the light source 10a on the optical sensor 10b. The reference character 10d denotes cover glass as a transparent member for guiding the original near the reading position P1, and the cover glass 10d covers the opening portion 6b of the lower original guide 6. The reference character 10e designates a sensor chassis as a holding member for positioning and fixing the light source 10a, the optical sensor 10b and the SELFOC lens 10c.

The lower original guide 6 is provided with an opening portion (a hollow portion) 6b near the reading position P1, and is provided with a mounting portion 6a for mounting and fixing the sensor chassis 10e so as to be opposed to the opening portion 6b, and the above-described constituents together form an intimate contact type image sensor unit U1 in the mounting portion 6a.

Also, a method of assembling the constituent members in the mounting portion 6a is a method of successively fitting the optical sensor 10b, the sensor chassis 10e, the SELFOC lens 10c, the light source 10a and the cover glass 10d, and it is possible to assemble the intimate contact type image sensor unit U1 easily.

At this time, the cover glass 10d is fixed so as to strike against the SELFOC lens 10c, whereby it becomes possible to fix the SELFOC lens 10c, the sensor chassis 10e and the optical sensor 10a in a state in which they are sandwiched between the cover glass 10d and the bottom of the mounting portion 6a, and the alignment thereby in the direction of the optical axis in the intimate contact type image sensor unit U1 is unnecessary. Accordingly, the positioning of the constituent members is accomplished simply by fitting them and therefore, the adjustment thereof is unnecessary and the assembling property is good.

If the plate thickness of the cover glass 10d and the dimension of the sensor chassis 10e from the SELFOC lens 10c to the optical sensor 10a are predetermined, focusing can be done without adjusting the focal length.

Describing the reading operation in the above-described construction, the original is conveyed to the reading position P1 while being nipped between the paper feeding roller 1 and the paper feeding pinch roller 2.

An inclined portion 6c is provided on a portion of the lower original guide 6 so that in the course of the conveyance, the leading end of the original may not be caught by the edge of the cover glass 10d.

The original is brought into intimate contact with the cover glass 10d by the original keeping plate 8 at the reading position P1 so that it may not be out of focus and the image may not blur. The original is then conveyed toward the paper discharging roller 3 and the paper discharging pinch roller 4 while the information of the original is read one line by one line by the intimate contact type image sensor unit U1, and when the reading is finished, the original is discharged by the paper discharging roller 3 and the paper discharging pinch roller 4.

Thus, the intimate contact type image sensor unit U1 is constructed integrally with the lower original guide 6, and stable image reading can be effected without their mutual positions being deviated from each other.

To fix the cover glass 10d, there is conceived a method of forcing it into the mounting portion 6a, adhesively securing it or keeping the lengthwisely opposite ends of the cover glass 10d outside the range of passage of the original by leaf springs or snap fit, but the method of forming it into the mounting portion 6a is desirable from the viewpoint of curtailing the number of parts and the number of assembling steps.

Also, the cover glass 10d may be replaced by any material such as resin which is difficult to be injured by the passage of the original and which sufficiently transmits light therethrough.

Also, in the present embodiment, the mounting portion 6a forming the intimate contact type image sensor is provided in the lower original guide, whereas this is not restrictive, but the mounting portion 6a may be provided in the upper original guide without any problem.

(Embodiment 2)

Figure 2:
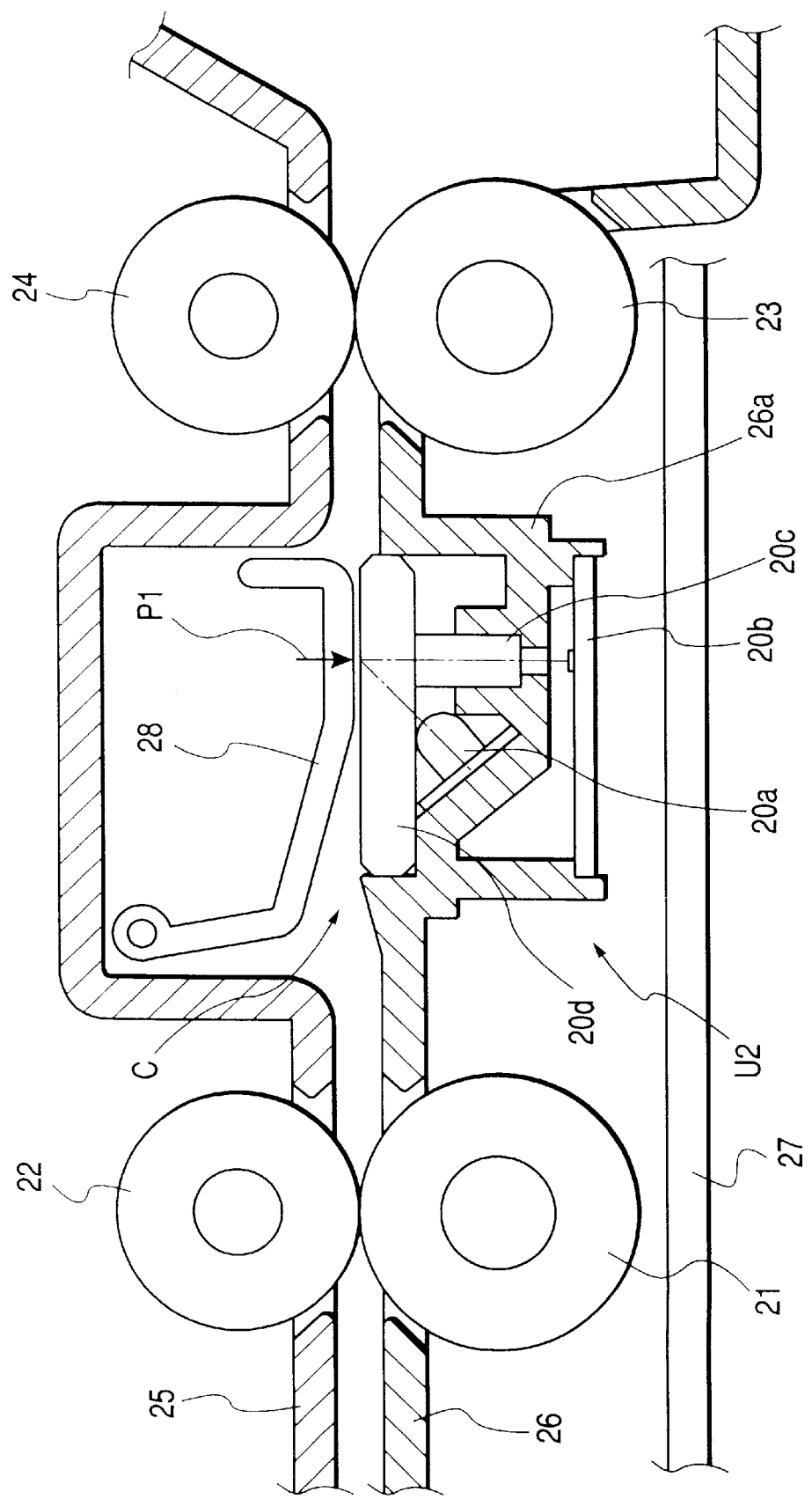
FIG. 2 is a cross-sectional view of the essential portions of an image reading apparatus according to a second embodiment of the present invention.
Figure 3:
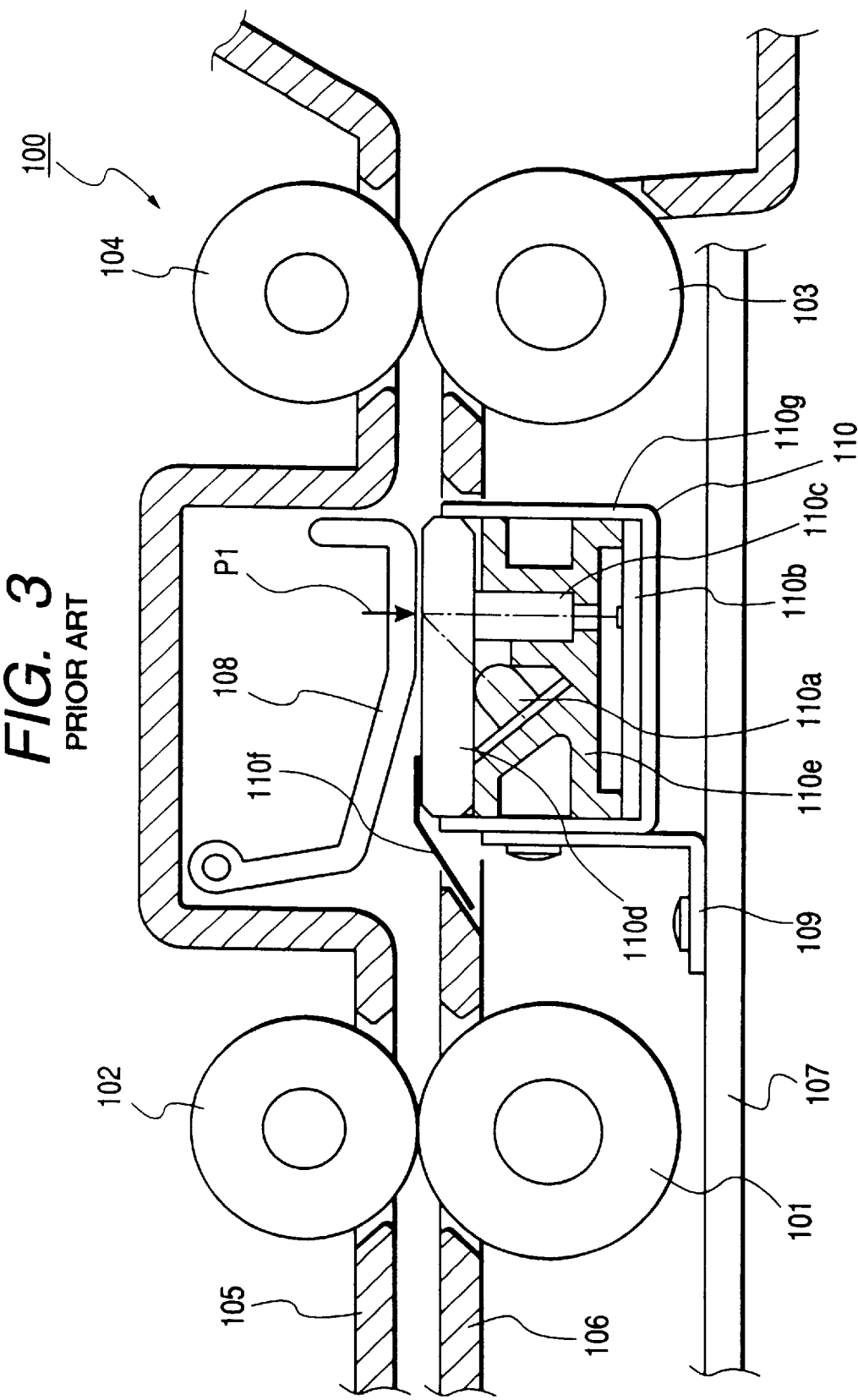
FIG. 3 is a cross-sectional view of the essential portions of an image reading apparatus according to the prior art.

FIG. 2 is a cross-sectional view of the essential portions of an image reading apparatus according to a second embodiment of the present invention.

In FIG. 2, the reference numeral 21 designates a paper feeding roller for feeding an original to a reading position A, the reference numeral 22 denotes a paper feeding pinch roller, the reference numeral 23 designates a paper discharging roller for discharging the read original, the reference numeral 24 denotes a paper discharging pinch roller, the reference numeral 25 designates an upper original guide forming the upper portion of an original conveying route, the reference numeral 26 denotes a lower original guide forming the lower portion of the original conveying route, the reference numeral 27 designates the body frame of the image reading apparatus, and the reference numeral 28 denotes an original keeping plate for preventing the floating of the original at the reading position P1.

In this embodiment, the construction of an intimate contact type image sensor unit U2 formed integrally with the lower original guide 26 differs. That is, a light source 20a, an optical sensor 20b, and a SELFOC lens 20c are held so as to be fixed to a holding portion 26a formed integrally with the lower original guide 26 while keeping predetermined positional relationship.

The original reading operation is similar to that in the above-described first embodiment.

In the present embodiment, the SELFOC lens 20c is held in the intimate contact type image sensor unit U2 of the lower original guide 26 and the distance to the optical sensor 20b is made into a predetermined length, whereby the sensor chassis 10e described in the previous embodiment becomes unnecessary, and the number of parts can be further curtailed to thereby reduce the cost.

Also, in the construction of the present embodiment, if the SELFOC lens 20c is molded or insert-molded integrally with the lower original guide 26, the number of parts can be further decreased and the number of assembling steps can be curtailed.

The present invention is not restricted to the above-described embodiments, but includes the modifications of the same technical idea.

What is claimed is:

1. An image reading apparatus comprising:
   a photoelectric converting element for receiving light obtained from an original illuminated by a light source;
   a lens for imaging the light obtained from the original on said photoelectric converting element;
   a holding member for holding said lens; and
   a guide member for guiding the original to an original reading position;
   wherein said holding member is molded integrally with said guide member.

2. An image reading apparatus according to claim 1, wherein said holding member holds said photoelectric converting element.

3. An image reading apparatus according to claim 1, wherein said holding member holds the light source.

4. An image reading apparatus according to claim 1, wherein said lens is insert-molded with said holding member.

5. An image reading apparatus according to claim 1, wherein said guide member includes a hollow portion for holding said holding member directly, and said photoelectric converting element contacts a bottom surface of the hollow portion of said guide member.

6. An image reading apparatus according to claim 1, wherein said guide member includes a hollow portion for holding said holding member directly, and further comprising a cover glass covering the hollow portion of said guide member, said cover glass abutting against said lens.

* * * * *